No. 891,153. PATENTED JUNE 16, 1908.
A. C. DOWSE.
LINK CONNECTION.
APPLICATION FILED NOV. 21, 1907.
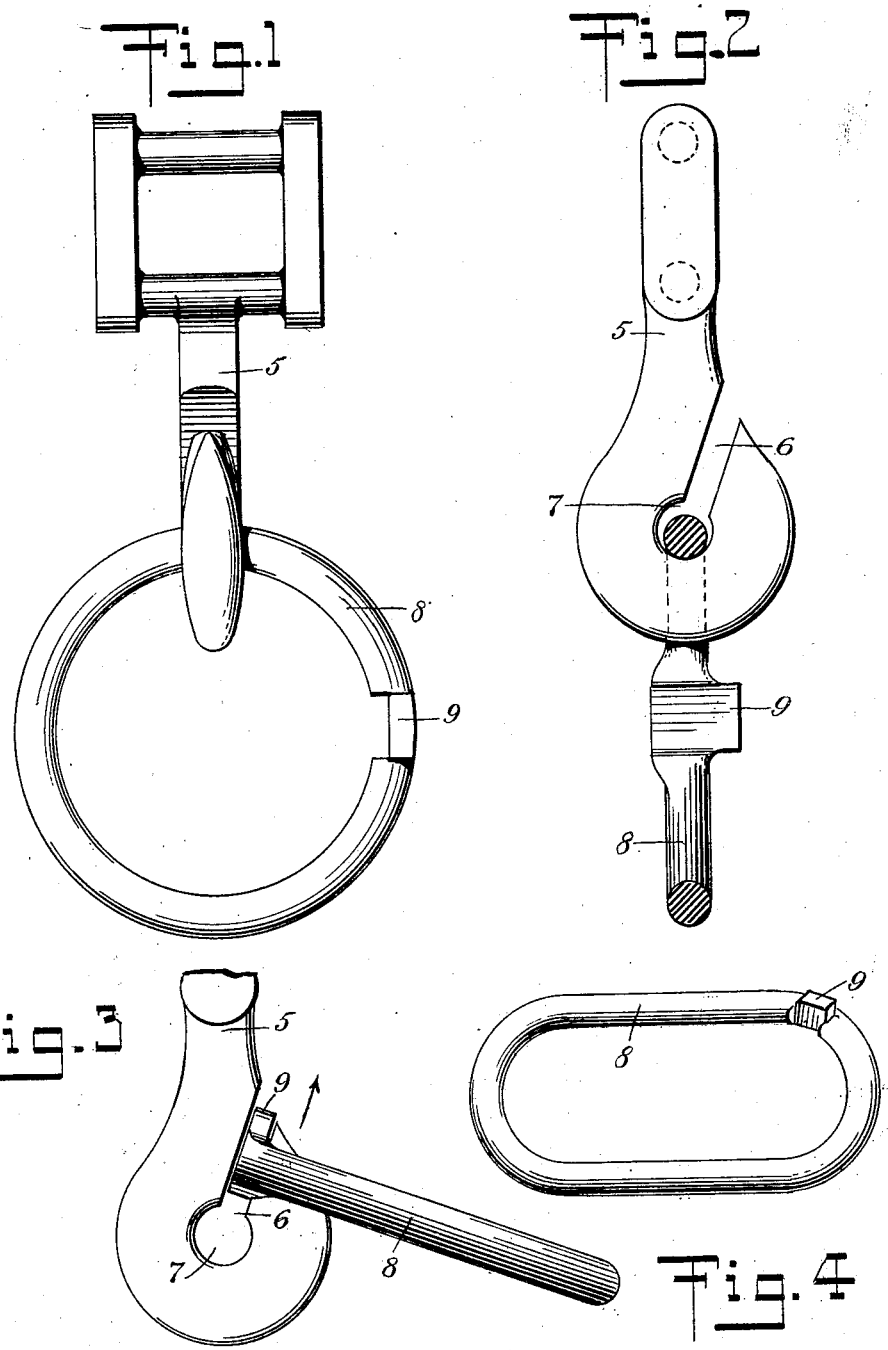
WITNESSES
INVENTOR
Alfred C. Dowse
BY
ATTORNEYS

UNITED STATES PATENT OFFICE.

ALFRED CHARLES DOWSE, OF TAYLOR, PENNSYLVANIA, ASSIGNOR OF ONE-HALF TO HARRY P. JONES, OF TAYLOR, PENNSYLVANIA.

LINK CONNECTION.

No. 891,153.      Specification of Letters Patent.      Patented June 16, 1908.

Application filed November 21, 1907. Serial No. 403,168.

*To all whom it may concern:*

Be it known that I, ALFRED CHARLES DOWSE, a citizen of the United States, and a resident of Taylor, in the county of Lackawanna and State of Pennsylvania, have invented a new and Improved Link Connection, of which the following is a full, clear, and exact description.

This invention is an improvement in link connections adapted for use in any relation where a secure but easily detached line, chain, or such other device, is desired, such, for example, as in harness, vehicles, on shipboard, etc.

Reference is to be had to the accompanying drawings forming a part of this specification, in which similar characters of reference indicate corresponding parts in all the views.

Figure 1 is a face view of a link connection embodying my invention; Fig. 2 is a corresponding view at right - angles to Fig. 1, partly in section; Fig. 3 is a view illustrating the manner in which the link is disconnected; and Fig. 4 is a perspective view of a flattened link having my improvement applied thereto.

In carrying out my invention, I employ a hook or eye member 5 having a radially-arranged slot 6 adjoining the shank thereof and passing into the eye or central opening 7. The slot 6 is of less width than the eye 7, and in view of its relative location will be at all times removed from the engaging or working portion of the hook.

Adapted to engage with the eye member or hook 5, is a link 8 which may be circular, as shown in Fig. 1, or of the ordinary flattenel elliptical form, as shown in Fig. 4. This link is constructed at a point of its length with a flattened portion 9 of reduced thickness, the reduction in the thickness of the metal being made at the inside of the link in order that the outer face of the flattened portion 9 will be continuous with the link's periphery.

The flattened portion 9 is arranged at substantially right-angles to the plane of the opening in the link, and is extended a substantial distance at one side in order to compensate for the metal removed at its inner face, thus making the link of substantially uniform strength throughout its length. This extension of the flattened portion 9 also prevents this part of the link from being drawn through the eye 7 of the hook, whereby it is unlikely that it will become accidentally disengaged. Unintentional disengagement of the link is obviously rendered more remote by arranging the flat portion at right-angles to the plane of the link opening.

While it is practically impossible to accidentally separate the hook and link, the same may nevertheless be readily disengaged by any one familiar with the construction; this being accomplished by drawing the link through the hook until the flattened portion registers with the slot 6, as shown in Fig. 3, in which position the disconnection and assemblage of the two members may be easily effected.

Having thus described my invention, I claim as new and desire to secure by Letters Patent:

The combination of a member having an eye and provided with a slot passing therethrough connecting with the eye, and a link constructed of a material of greater diameter than the width of the slot and of slightly less diameter than the diameter of said eye, and provided with a flattened portion arranged at an angle to the plane of its opening and adapted to pass through said slot, the reduction in the thickness of the material of which the link is composed being made at the inside of the link, whereby the outer face of the flattened portion will be unbroken and on a line with the adjacent portions of the link's periphery.

In testimony whereof I have signed my name to this specification in the presence of two subscribing witnesses.

ALFRED CHARLES DOWSE.

Witnesses:
    WALTER G. CUSTER,
    MORGAN J. JONES.